March 9, 1926.
R. B. SHOEMAKER
RETOUCHING MACHINE
Filed May 14, 1924
1,576,006
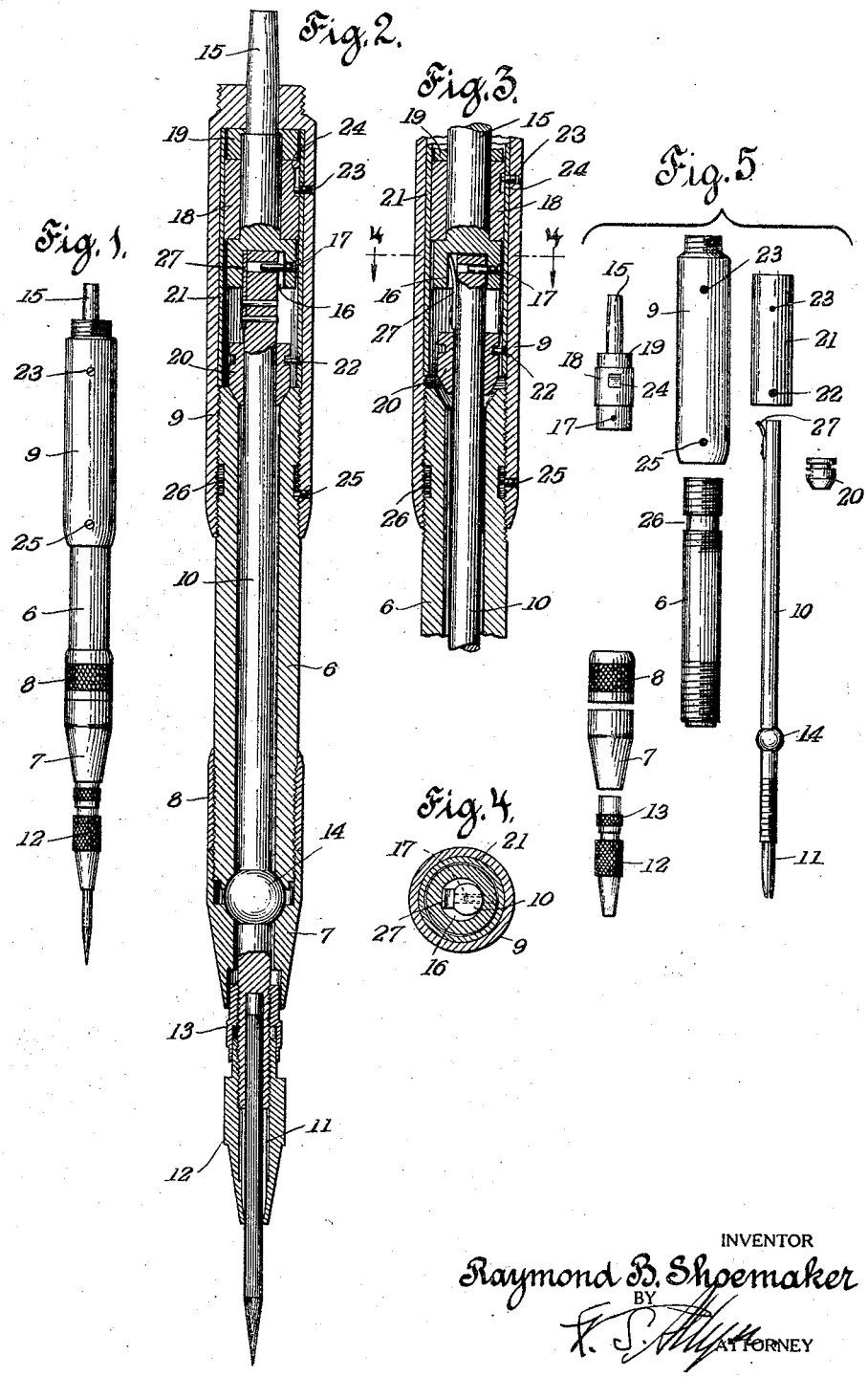
INVENTOR
Raymond B. Shoemaker
BY
ATTORNEY Patented Mar. 9, 1926.

1,576,006

UNITED STATES PATENT OFFICE.

RAYMOND B. SHOEMAKER, OF NEW YORK, N. Y., ASSIGNOR TO PHOTOGRAPHERS RETOUCHING SERVICE INC., OF NEW YORK, N. Y.

RETOUCHING MACHINE.

Application filed May 14, 1924. Serial No. 713,174.

To all whom it may concern:

Be it known that I, RAYMOND B. SHOEMAKER, a citizen of the United States of America, residing at city, county, and State of New York, have invented a new and useful Retouching Machine, of which the following is a specification.

My invention relates to machines or instruments which are mechanically or electrically driven for the use of photograpers, retouchers, artists, photoengravers, architects, designers and engineers in retouching, dressing and toning photographic plates, films, prints, pictures and various materials from which a print is made, to correct and form designs before or after printing by utilizing inscribed, overlapping and concentric circles and ovals of various sizes formed in continuous interlinked succession in contradistinction to the dots, lines and hooks commonly employed.

In carrying this invention into effect I have sought to employ simple and reliable mechanism which can be readily adjusted to alter the size of the circle or oval. Another object is to provide simple means for quickly changing or adjusting the device so as to make either a dot, a circle, oval or a series of loops as necessity may require.

In carrying this invention into effect I employ a shaft and an enclosing tubular member. The shaft has a universal joint in one end of the tubular member. The other end of the shaft has a simple form of coupling within the tubular member. The tubular member is formed in sections, parts of which are movable for the purpose of clamping the shaft and controlling the coupling.

Figure 1 is a side view of an instrument embodying improvements of my invention.

Figure 2 is an enlarged longitudinal sectional view showing the shaft disposed centrally.

Figure 3 is a fragmentary sectional view showing the coupling displaced and the shaft tilted.

Figure 4 is a transverse sectional view on the plane of the line 4—4 of Figure 3.

Figure 5 is an exploded view showing various parts of the instrument.

The tubular member consists of the body 6, the bearing 7, a check nut or sleeve 8 and the adjusting sleeve 9 all of which have screw threaded connections.

The shaft 10 has jaws 11 for clutching the pencil or other marking member. The jaw clamping member 12 and the check nut 13 have threaded engagement with the shaft. The shaft also has a spherical enlargement 14 which constitutes a ball bearing or universal joint which is seated between the ends of the body 6 and the bearings 7. The shaft member 15 is adapted to be driven from any suitable source of power and has a recess or socket 16 adapted to receive the end of the shaft 10. These shaft parts are loosely connected together by a screw 17. The shaft 15 is preferably provided with a bearing sleeve 18 and a collar 19, sleeve 18 being loose so that the other parts may turn in it.

The cone clutch 20 is mounted on the shaft 10 and connected to the sleeve 21 by a screw 22 extending into an annular slot in the clutch member 20. The screw 23 passes through the adjusting member 9 and the sleeve 21 into a recess 24 in the bearing 18. The screw 25 passes through the sleeve 9 into a groove 26 in the body 6 of the tubular member. A spring 27 fastened to the end of the shaft 10 bears against one side wall of the recess or socket 16 in the end of the shaft member 15.

When the parts are in the position shown in Figure 2 the clutch member 20 is seated in the upper end of the tubular handle member 6 so that the shaft 10 is centrally located in the tubular member. When the shaft is driven this will produce a dot if the member is held stationary. When it is desired to make small circles the adjusting sleeve 9 is retracted. This disengages the clutch member 20 from the upper end of the tubular body 6 and the spring 27 automatically tilts the shaft 10 so that the continued rotation of the shaft will cause the pencil or other marking point to wabble or draw small circles. These circles will become larger as the sleeve 9 is backed off further until the maximum size possible for that design of instrument is attained. Reverse adjustment of the sleeve 9 brings the two parts of the shaft into alinement and reduces the size of circles automatically produced until a point is reached.

It will be seen that the construction and mode of operation are very simple. It has been found possible with such a device to very materially speed up the work of retouching or the like.

I claim:

1. A retouching pencil comprising a tubular body having a cone seat in its rear end and a spherical seat in its front end, a shaft having a ball bearing in said spherical seat and a cone slidable on said shaft to coact with the rear seat, a rear driving extension having an elongated recess for the end of said shaft, means for adjusting said cone longitudinally and means for tilting said shaft when said cone is unseated.

2. A retouching instrument comprising a tubular body having a ball seat at one end and a clutch seat at the other, a shaft within said body having a ball bearing on one seat and a slidable clutch adapted to co-act with the other seat, and adjustable bearing co-acting with said body and with said ball, an adjustable sleeve co-acting with the other end of said body, a means of connection between said sleeve and said clutch member whereby said clutch member is disengaged upon movement of said adjustable sleeve.

3. A retouching instrument comprising a tubular body, a shaft extending through said body and having a universal connection with one end of said body, a sleeve adjustable on the other side of said body, a shaft member having a bearing in said sleeve and having a displaceable coupling with said first mentioned shaft, a bearing member mounted on said shaft, a spring for automatically displacing said shaft when said bearing is moved longitudinally, a means of connection between said bearing and said sleeve.

4. A retouching device comprising a tubular main body, a shaft having a tiltable universal bearing at one end of said body, a sliding and transversely movable bearing for said shaft at the other end of said body, a stationary seat for said sliding bearing, a shaft extension coupled to said before mentioned shaft and means for shifting said sliding bearing and tilting said shaft.

5. A retouching device comprising a tubular body, a pencil shaft having a universal bearing in one end of said body, a driving extension from said shaft, a sliding bearing for said shaft, an outer adjusting sleeve connected to said body and having a bearing for said extension, and an inner sleeve connection between said outer sleeve and said bearing for longitudinally moving said bearing when said sleeve is rotated.

6. A retouching device comprising a tubular body, a shaft extending therethrough and having a universal connection at one end, and extension having an eccentric recess connection with said shaft, a spring in said recess, a sliding bearing for said shaft and a sleeve for moving said bearing and permitting said spring to tilt said shaft.

7. A retouching pencil comprising a tubular body, a pencil shaft tiltably and rotatably mounted in the outer end, a sleeve screw-threaded on the other end of said body and having a bearing, a driving extension shaft having a seat in said bearing and having an elongated recess for the inner end of said tiltable pencil shaft, a clutch cone slidable on said pencil shaft and adapted to be centered in the end of said tubular body and means of connection between said sleeve and said clutch cone to move said cone longitudinally when said sleeve is rotated.

RAYMOND B. SHOEMAKER.